Feb. 6, 1951 M. COEUR 2,540,100
TRAILER WITH HYDRAULIC LIFT
Filed Feb. 25, 1948 2 Sheets-Sheet 1

Inventor

Mel Coeur

By Clarence A. O'Brien
and Harvey B. Jacobson
Attorneys

Feb. 6, 1951 M. COEUR 2,540,100
TRAILER WITH HYDRAULIC LIFT
Filed Feb. 25, 1948 2 Sheets-Sheet 2
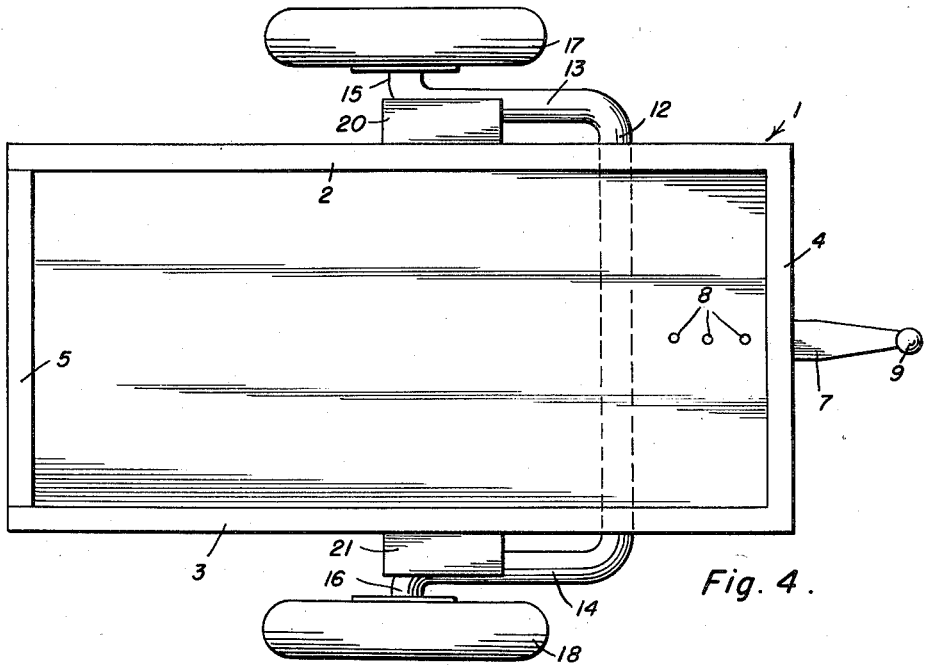
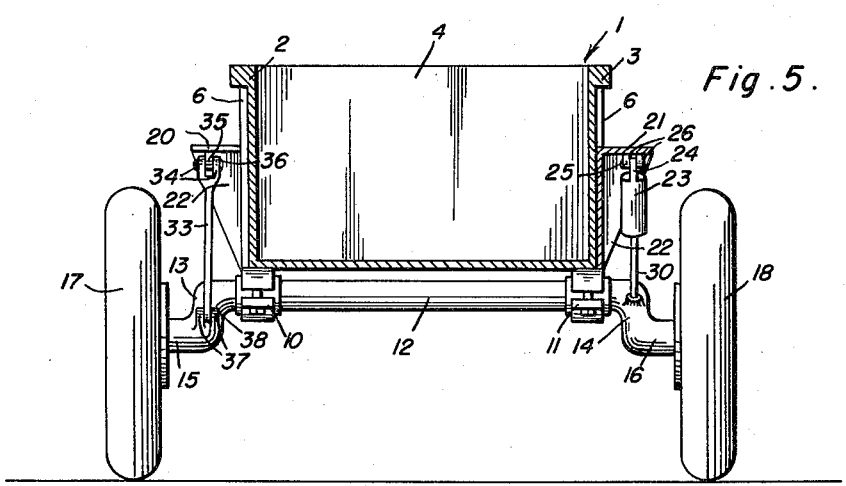
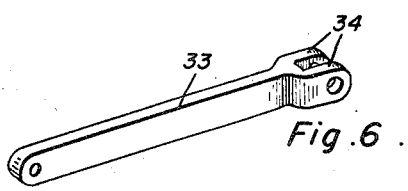
Mel Coeur
INVENTOR.

Patented Feb. 6, 1951

2,540,100

UNITED STATES PATENT OFFICE 2,540,100

TRAILER WITH HYDRAULIC LIFT

Mel Coeur, Galveston, Tex.

Application February 25, 1948, Serial No. 10,722

2 Claims. (Cl. 280—44)

1

This invention relates to improvements in trailers provided with hydraulic lifts at either side thereof.

An object of the invention is to provide an improved trailer construction in which hydraulic lifts are provided whereby the trailer body may be lowered to near ground level for loading, and then the hydraulic lifts may be operated to raise the trailer body to its elevated or travelling position.

Another object of the invention is to provide an improved trailer construction having a U-shape rotatably supported axle with wheel supporting spindles extending outwardly in opposite directions at the outer ends thereof, together with hydraulic lifts at the opposite sides of the trailer body connected respectively to the trailer body and to the side arms of the U-shape axle, whereby the trailer body may be lowered to near the ground level while loading, and raised by means of said hydraulic lifts to its elevated or travelling position after the loading operation has been completed.

A further object of the invention is to provide an improved trailer with hydraulic lifts for raising and lowering the trailer body with respect to the ground level, said device being highly efficient in operation and relatively inexpensive to manufacture and produce.

Other objects will appear as the description proceeds.

In the accompanying drawings which form a part of this application,

Figure 4 is a top plan view of the improved trailer;

Figure 5 is a sectional view taken on the line 5—5 of Figure 1, and

Figure 6 is a perspective view of one form of reinforcing strut used for supporting the trailer body when in elevated or travelling position.

Like characters of reference are used throughout the following specification and the accompanying drawings to designate corresponding parts.

2

Figure 1:
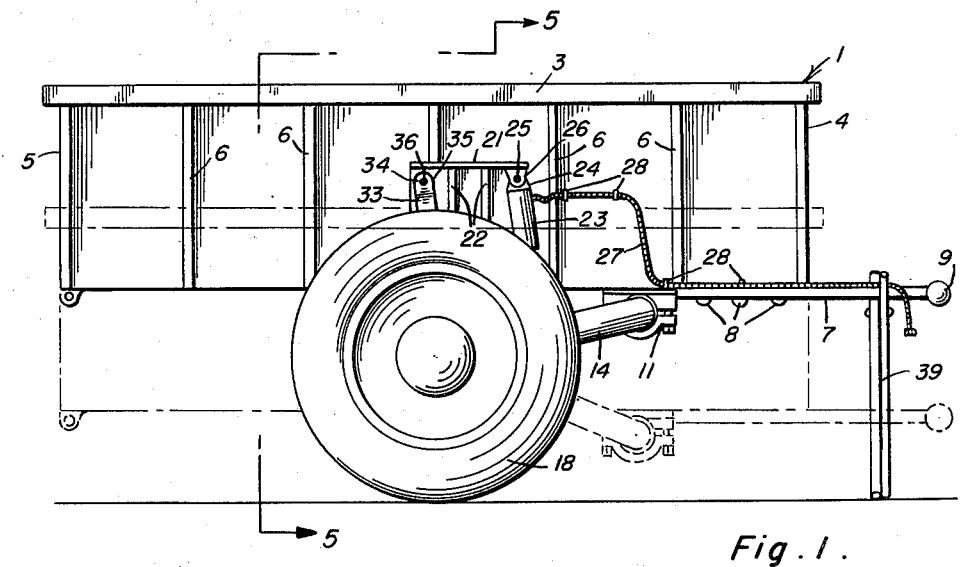
Figure 1 is a side elevation of the improved trailer showing the body of the same in elevated or travelling position in full lines, and in lower or loading position in dotted lines.
Figure 2:
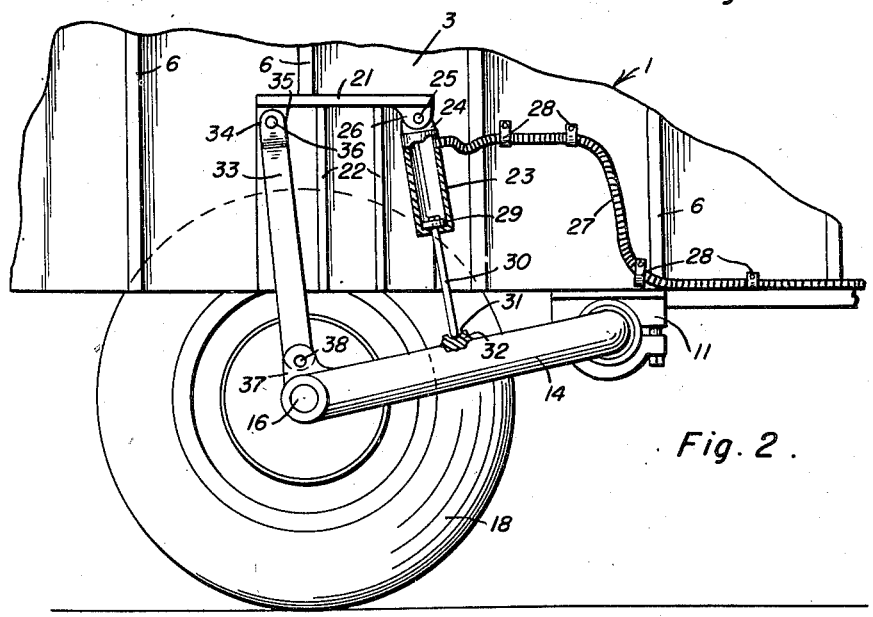
Figure 2 is an enlarged detail side elevation of the U-shape axle and hydraulic lift and strut supported by the bracket attached to the side of the trailer body with said body in elevated or travelling position.
Figure 3:
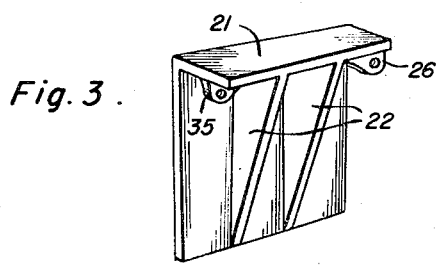
Figure 3 is a perspective view of one of the inverted L-shape brackets attachable to the opposite sides of the trailer body.

In carrying out the invention, there is provided an improved form of trailer generally designated by the reference numeral 1 including a substantially rectangular body having opposite sides 2 and 3 and opposite ends 4 and 5, the same being suitably reinforced by the spaced vertical batten strips 6.

A forwardly extending centrally disposed tongue 7 is secured to the trailer body 1 by means of the bolts 8, and is formed with a ball 9 on its forward end for attaching the trailer 1 to a suitable trailer hitch (not shown) disposed upon an automobile (also not shown).

Transversely spaced split bearings 10 and 11 are secured to the bottom of the trailer body 1, and rotatably support the base portion 12 of the U-shape axle, whose side arms 13 and 14 extend rearwardly, terminating in the outwardly extending spindles 15 and 16 upon which the rubber tired wheels 17 and 18 are rotatably mounted.

Inverted L-shape brackets 20 and 21 are secured in any desired manner to the opposite sides 2 and 3 of the trailer body 1, and are reinforced by the integrally formed spaced vertical webs 22.

Hydraulic cylinders 23 are formed with attaching ears 24 on their upper ends and are adapted to be pivotally supported upon the pins 25 between the spaced depending ears 26 formed on the brackets 20 and 21. Flexible conduits 27 are attached to the upper and inner ends of the hydraulic cylinders 23 and are supported in place by the clamps 28. The opposite ends of the flexible conduits 27 are attached to either a hand operated or machine operated pump (not shown).

Pistons 29 are slidably disposed in the hydraulic cylinders 23 and are connected to the upper ends of the piston rods 30, whose lower ends are adapted to seat in the arcuate semi-circular seats 31 on the upper ends of the lugs 32 formed on the side arms 13 and 14 of the U-shape axles.

Metal struts or strut members 33 having forked upper ends 34 are adapted to be disposed over the depending ears 35 on the brackets 20 and 21, and are pivotally mounted upon the pins 36 extending through said forked ends 34 and the ears 35.

The lower ends of the struts 33 may seat upon the terminal ends of the side arms 13 and 14 of the U-shape axle, or they may be apertured and disposed between the upstanding spaced ears 37 on said arms 13 and 14, and be secured thereto by means of the pins 38.

In operation, when it is desired to load the trailer 1, the hydraulic fluid will be exhausted from the hydraulic cylinders 23 and the body of the trailer 1 will be lowered to the position as shown in dotted lines in Figure 1 of the drawings. In this position, should animals such as hogs or sheep be loaded into the trailer body, they may readily walk directly into the open rear end of the body without having to walk up any form or type of ramp.

When the trailer body 1 has been loaded, hydraulic fluid may be pumped into the hydraulic cylinders 23 and the wheels 17 and 18 lowered until the trailer body 1 assumes its elevated or travelling position, as shown in full lines in Figure 1 of the drawings.

In the event that the trailer has been disconnected from the automobile (not shown) which is used for hauling the same, by placing the crossed supporting brace 39 under the forward end of the tongue 7 of the trailer 1, the trailer body will be supported in substantially level position.

From the foregoing description, it will be seen that there has been devised and provided a highly efficient form of trailer with hydraulic lift, which may be readily manufactured at a relatively low cost.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A hydraulic lift for trailers comprising a U-shaped axle rotatably carried by a trailer and having laterally extending wheel supporting spindles on the terminal ends of said axle, L-shaped brackets fixed to the sides of a trailer and including reinforcing webs, forward and rear ears depending from the shorter leg of each of said brackets, further ears carried by the legs of said axle, strut members between said further ears and said rear ears, cylinders pivoted to the forward ears, pistons positioned in said cylinders for reciprocable movement, hydraulic means connected to said cylinders for operating said pistons, and rods carried by the said pistons and including free ends projecting from said cylinders, the leg portions of said axle having recesses therein for receiving the free ends of said rods.

2. A hydraulic lift for trailers comprising a U-shaped axle rotatably carried by a trailer and having laterally extending wheel supporting spindles on the terminal ends of said axle, L-shaped brackets fixed to the sides of a trailer and including reinforcing webs, forward and rear ears depending from the shorter leg of each of said brackets, further ears carried by the legs of said axle, elongated strut members having first and second end portions, pivot pins securing the first end portions of said strut members to said further ears, cylinders pivoted to said forward ears, pistons positioned in said cylinders for reciprocation, hydraulic means connected to said cylinders for operating said pistons, rods secured to the pistons and slidably carried by the pistons, said rods having end portions projecting from the cylinders, the leg portions of said axle having recesses therein for receiving the end portions of said rods during movement of said rods for rotating the axle to lower the spindles, and means securing the second end portions of strut members to the rear ears to hold the spindles in their lowered position and the axle against rotation.

MEL COEUR.

REFERENCES CITED

The following references are of record in the file of this patent:

UNITED STATES PATENTS

| Number | Name | Date |
|---|---|---|
| 184,283 | Forbes | Nov. 14, 1876 |
| 489,628 | Colleret | Jan. 10, 1893 |
| 1,557,115 | Stevenson | Oct. 13, 1925 |
| 1,610,881 | Reinsch | Dec. 14, 1926 |
| 1,941,143 | Wickersham | Dec. 26, 1933 |
| 1,975,119 | Oates | Oct. 2, 1934 |
| 2,061,025 | Dwork | Nov. 17, 1936 |
| 2,179,477 | Berendsen | Nov. 14, 1939 |
| 2,227,762 | Ronning | Jan. 7, 1941 |
| 2,229,352 | Thannhauser | Jan. 21, 1941 |
| 2,328,849 | Schoelm | Sept. 7, 1943 |